(12) United States Patent
Kalra

(10) Patent No.: US 11,875,630 B2
(45) Date of Patent: Jan. 16, 2024

(54) SHARED ELECTRONIC GAMING MACHINE INTERFACE INCLUDING OVERSIZED BUTTON DECK ASSEMBLY

(71) Applicant: Aristocrat Technologies Australia Pty Limited, North Ryde (AU)

(72) Inventor: Harsh Kalra, Box Hill (AU)

(73) Assignee: Aristocrat Technologies Australia Pty Limited, North Ryde (AU)

(*) Notice: Subject to any disclaimer, the term of this patent is extended or adjusted under 35 U.S.C. 154(b) by 184 days.

(21) Appl. No.: 17/669,770

(22) Filed: Feb. 11, 2022

(65) Prior Publication Data

US 2022/0262195 A1 Aug. 18, 2022

Related U.S. Application Data

(60) Provisional application No. 63/149,519, filed on Feb. 15, 2021.

(51) Int. Cl.

| | |
|---|---|
| *G07F 17/32* | (2006.01) |
| *A63F 13/86* | (2014.01) |
| *A63F 13/24* | (2014.01) |
| *A63F 13/847* | (2014.01) |
| *G07F 17/34* | (2006.01) |

(52) U.S. Cl.
CPC ...... *G07F 17/3209* (2013.01); *G07F 17/3211* (2013.01); *G07F 17/34* (2013.01); *A63F 13/24* (2014.09); *A63F 13/847* (2014.09); *A63F 13/86* (2014.09); *A63F 2300/308* (2013.01); *G07F 17/3216* (2013.01); *G07F 17/3274* (2013.01); *G07F 17/3279* (2013.01)

(58) Field of Classification Search
CPC ...................................................... G07F 17/34
See application file for complete search history.

(56) References Cited

U.S. PATENT DOCUMENTS

| | | |
|---|---|---|
| 7,967,674 B2 | 6/2011 | Baerlocher |
| 8,444,482 B2 | 5/2013 | Aoki |
| 8,622,799 B2 | 1/2014 | Pececnik |
| 10,410,467 B2 | 9/2019 | Acres |
| 2008/0113768 A1 | 5/2008 | Baerlocher |

*Primary Examiner* — Robert T Clarke, Jr.
(74) *Attorney, Agent, or Firm* — Armstrong Teasdale LLP

(57) ABSTRACT

An electronic gaming machine interface is described. The interface may be coupled to and shared between a plurality of electronic gaming machines. Accordingly, the interface may include a button deck assembly, which may, in turn, include a touch-sensitive video display, and a flange surrounding at least a portion of the button deck assembly. In some embodiments, the flange may include a first mechanical fastener configured to couple the button deck to a cabinet of a first electronic gaming machine, and a second mechanical fastener configured to couple the button deck to a cabinet of a second electronic gaming machine. The button deck may, in addition, be communicatively coupled to one or both of the first and second electronic gaming machines. As a result, in at least some embodiments, the button deck is supported by and communicatively coupled to the first electronic gaming machine and the second electronic gaming machine.

17 Claims, 8 Drawing Sheets

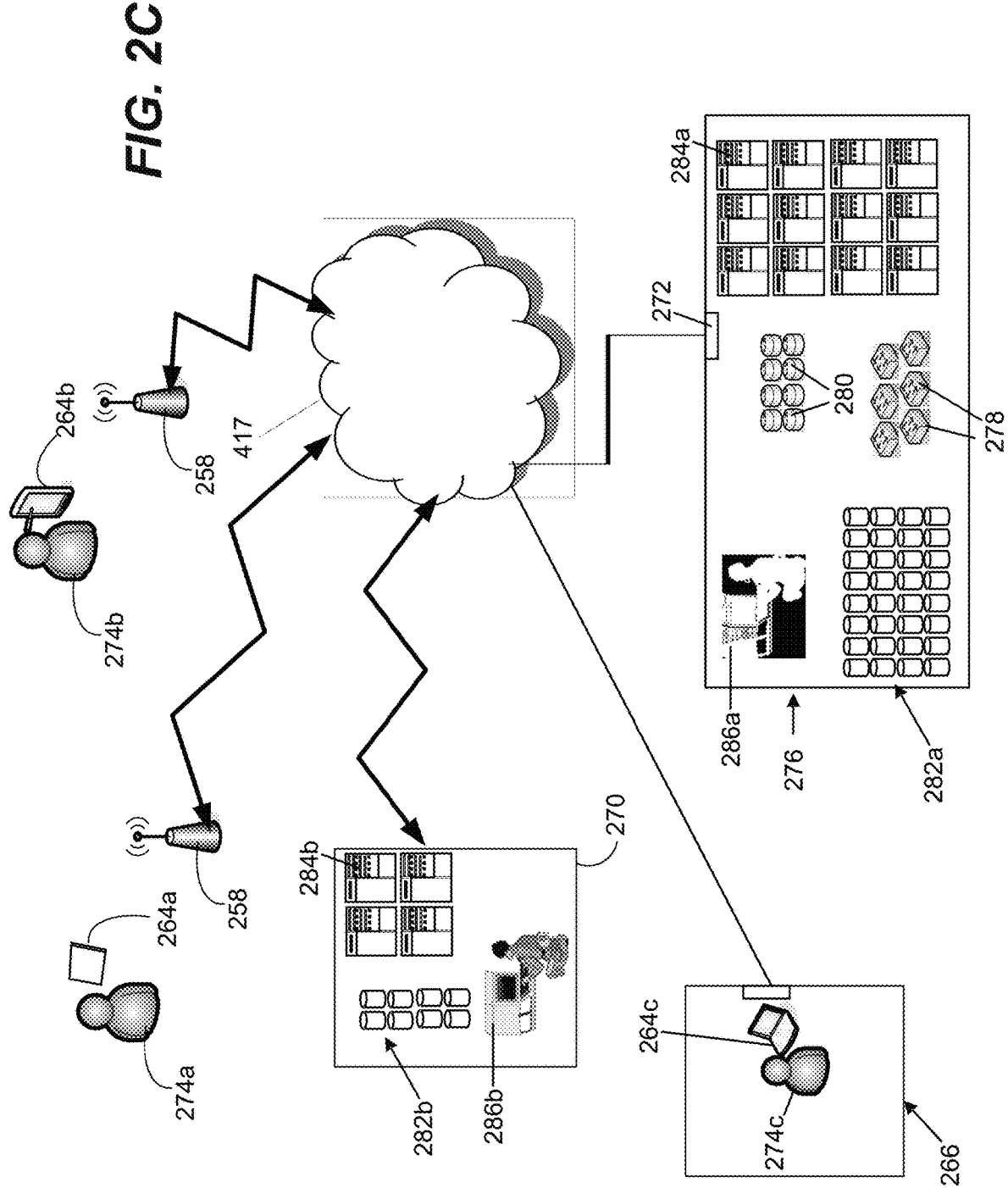

SHARED ELECTRONIC GAMING MACHINE INTERFACE INCLUDING OVERSIZED BUTTON DECK ASSEMBLY

CROSS-REFERENCE TO RELATED APPLICATIONS

This application claims the benefit of, and priority to, U.S. Provisional Patent Application Ser. No. 63/149,519, filed Feb. 15, 2021, and entitled "SHARED ELECTRONIC GAMING MACHINE INTERFACE INCLUDING OVERSIZED BUTTON DECK ASSEMBLY," the entire contents and disclosure of which are hereby incorporated in their entirety.

TECHNICAL FIELD

The present disclosure relates generally to the field of electronic gaming, and more particularly to a shared electronic gaming machine interface that includes an oversized button deck assembly.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

For game play itself, the player interfaces of gaming machines typically include a number of mechanical pushbuttons for manual activation by a player to select game preferences, activate a game sequence, or otherwise provide input to the gaming machine. The mechanical pushbuttons are typically arranged in combination on a surface of the gaming machine cabinet that is often referred to as a "button deck". Conventional button deck designs are disadvantaged in some aspects, however, and improvements are desired. For example, many conventional button decks lack a video display device. Likewise, conventional button decks are limited to a single electronic gaming machine and do not facilitate a shared electronic gaming machine interface or community play.

BRIEF DESCRIPTION

An electronic gaming machine interface is described. The interface may be coupled to and shared between a plurality of electronic gaming machines. Accordingly, the interface may include a button deck assembly, which may, in turn, include a touch-sensitive video display, and a flange surrounding at least a portion of the button deck assembly. In some embodiments, the flange may include a first mechanical fastener configured to couple the button deck to a cabinet of a first electronic gaming machine, and a second mechanical fastener configured to couple the button deck to a cabinet of a second electronic gaming machine. The button deck may, in addition, be communicatively coupled to one or both of the first and second electronic gaming machines. As a result, in at least some embodiments, the button deck is supported by and communicatively coupled to the first electronic gaming machine and the second electronic gaming machine.

In one aspect, a shared interface configured to connect to a plurality of electronic gaming machines is provided. The shared interface includes a button deck assembly including a display device. The shared interface may further include a memory device and a processor configured to execute instructions stored on the memory device, which when executed, cause the processor to at least communicate with a first electronic gaming machine to provide a first control instruction to the first electronic gaming machine, communicate with a second electronic gaming machine to provide a second control instruction to the second electronic gaming machine, and provide a shared game via the touch-sensitive display device, the shared game capable of being played by a first player of the first electronic gaming machine and a second player of the second electronic gaming machine.

In another aspect, a computer-implemented method performed by a shared interface configured to connect to a plurality of electronic gaming machines is provided. The shared interface includes a button deck assembly including a display device, a memory device, and a processor. The method includes communicating, by the processor, with a first electronic gaming machine to provide a first control instruction to the first electronic gaming machine, communicating, by the processor, with a second electronic gaming machine to provide a second control instruction to the second electronic gaming machine, and providing, by the processor, a shared game via the touch-sensitive display device, the shared game capable of being played by a first player of the first electronic gaming machine and a second player of the second electronic gaming machine.

In another aspect, a non-transitory computer-readable media having computer-executable instructions embodied thereon is provided. When performed by a processor a shared interface configured to connect to a plurality of electronic gaming machines, the shared interface including a button deck assembly including a display device, a memory device, and the processor, the computer-executable instructions cause the processor to communicate with a first electronic gaming machine to provide a first control instruction to the first electronic gaming machine, communicate with a second electronic gaming machine to provide a second control instruction to the second electronic gaming machine, and provide a shared game via the touch-sensitive display device, the shared game capable of being played by a first player of the first electronic gaming machine and a second player of the second electronic gaming machine.

BRIEF DESCRIPTION OF THE DRAWINGS

FIG. 2C is a diagram that shows examples of components of a system for providing online gaming according to some aspects of the present disclosure.

DETAILED DESCRIPTION

Figure 1:
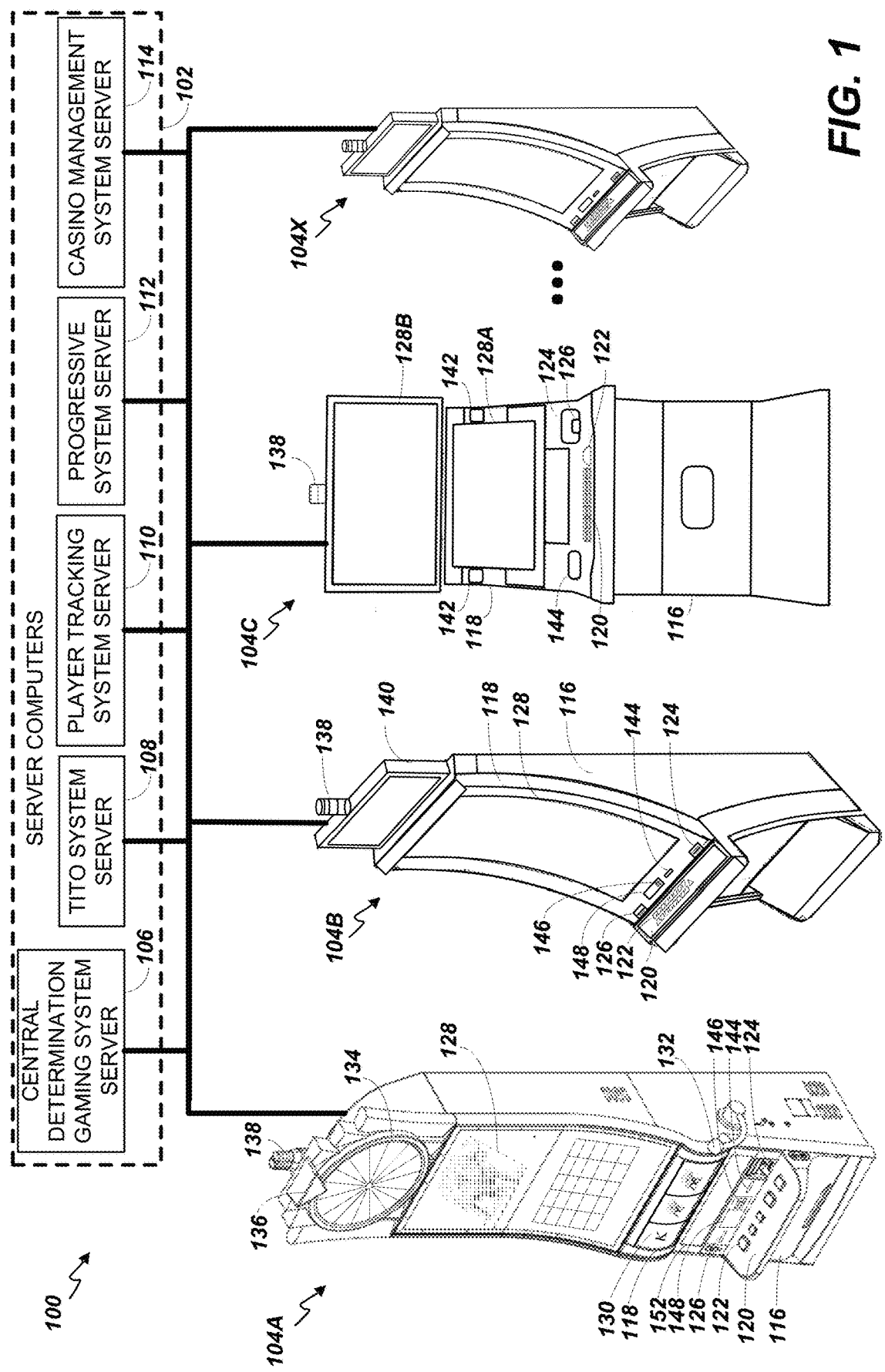
FIG. 1 is an exemplary diagram showing several EGMs networked with various gaming related servers.

An oversized button deck assembly defining a shared user interface is described. The button deck assembly can be coupled to a plurality of electronic gaming machines to form an oversized user interface that can be shared between each of the plurality of gaming machines. In some embodiments, the button deck assembly includes one or more mechanical pushbuttons as well as a video display device, which may be partitioned or segregated into one or more display portions, such as one display portion for every gaming machine to which the button deck assembly is coupled. As a result, a plurality of players may interact with the shared interface provided by the button deck assembly to provide control instructions to their respective gaming machines. Moreover, in at least some embodiments, during game play, for example during a base game or a bonus/feature game, the video display device of the button deck assembly may be controlled to display a shared or community game, or shared game outputs that may be used at either of the gaming machines.

In some embodiments, the button deck assembly may include a processor, which may be configured to communicate with the plurality of gaming machines to which the button deck assembly is coupled and/or facilitate communication between the gaming machines. Accordingly, the button deck assembly may receive gameplay data and/or other data (e.g., current spin credits, game and/or RNG call outcomes, currently displayed game features) from the gaming devices and/or may provide instructions to the gaming machines to facilitate multiplayer game features for users of the gaming devices. In some embodiments, the button deck assembly may, alternatively or additionally, use a processor at one or more of the gaming machines or at a backend server to process instructions for controlling content exchanged between the gaming machines and/or displayed on the display device of the button deck assembly.

For example, in some embodiments, the button deck assembly may provide a multiplayer "sharing" feature between two or more gaming machines. The button deck assembly may detect, at one of the gaming machines, an award of, for example, credits, free spins, prizes, multipliers, bonus game features, and/or other game features, and instruct at least other of the gaming machines to display the awarded feature and/or another feature (e.g., half of what was awarded to the other player). This may be accompanied by an animated display and/or message on the video display device. In another example, the button deck assembly may facilitate competition between two or more players, by detecting, for example, game outcomes at respective gaming devices, determining a winner based on the game outcomes, and displaying a winner from among the two or more players at the video display device. In such embodiments, the button deck assembly may instruct the gaming machine associated with the winner to provide one or more additional awards (e.g., credits, free spins, prizes, multipliers, bonus game features) to the winning player. By providing game features such as these, the button deck assembly may engage potential players who desire a multiplayer experience.

In some embodiments, one or more external processors (e.g., a backend server) may be used to perform any of the multiplayer gameplay functions described herein for games being executed and/or displayed on two or more different gaming machines, user devices (e.g., smart phones and/or tablets), or any combination thereof, without use of a physical coupling between the devices such as the button deck assembly. In such embodiments, the backend server may be coupled (e.g., wirelessly) in communication with the gaming machines or user devices and may at least partially control and/or execute display and/or gameplay functions on the gaming machines and user devices. For example, as described with respect to the button deck assembly, such a backend server may enable awards provided for one user at one gaming machines or user device to be identified and "shared" with another user at another gaming machines or user device by communicating with the gaming machines and/or user devices, and/or may enable competitive gaming between two users by receiving game data from one or more gaming machines and/or user devices and comparing the received game data corresponding to determine one or more "winners" from among these users based on the game data.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
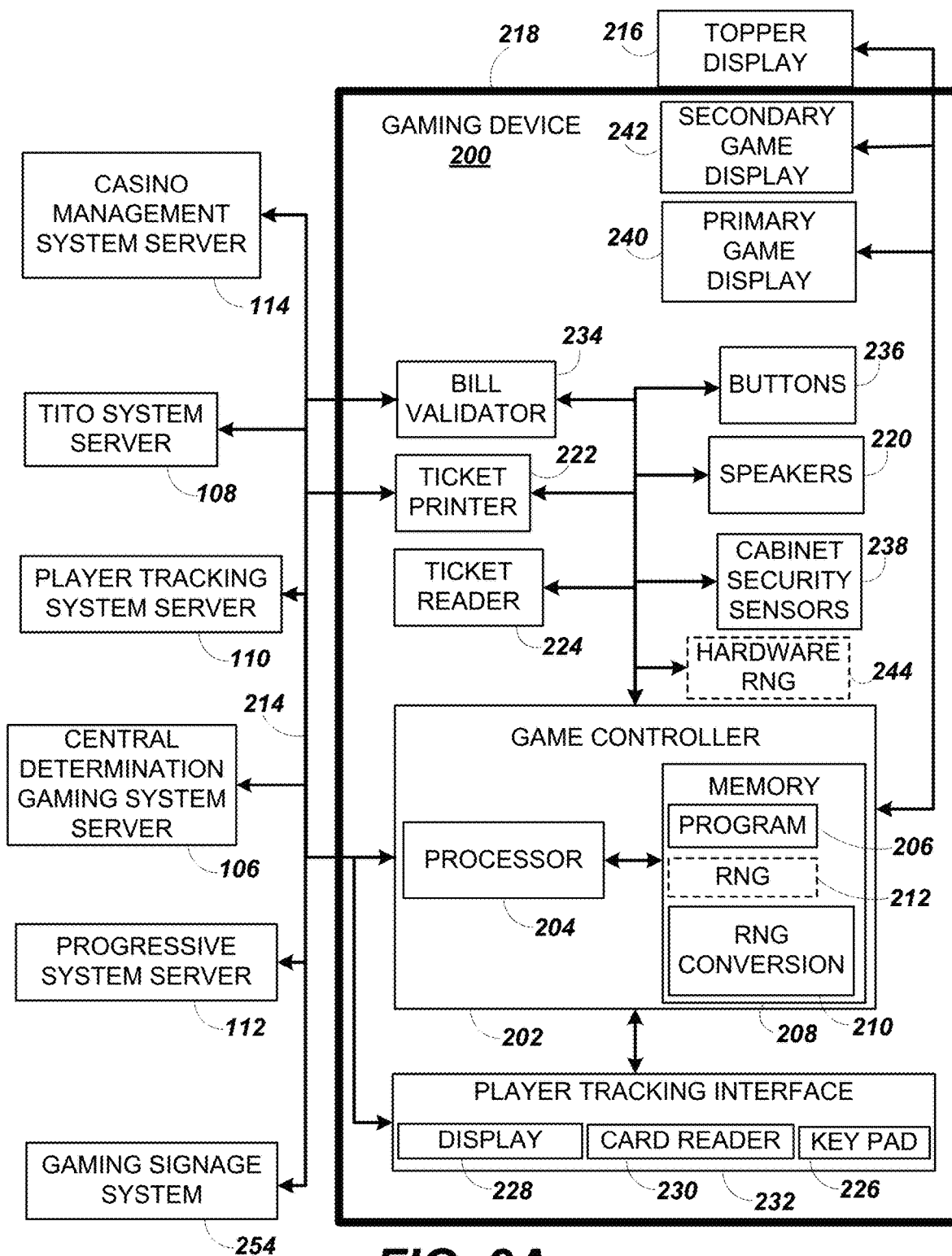
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2A also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
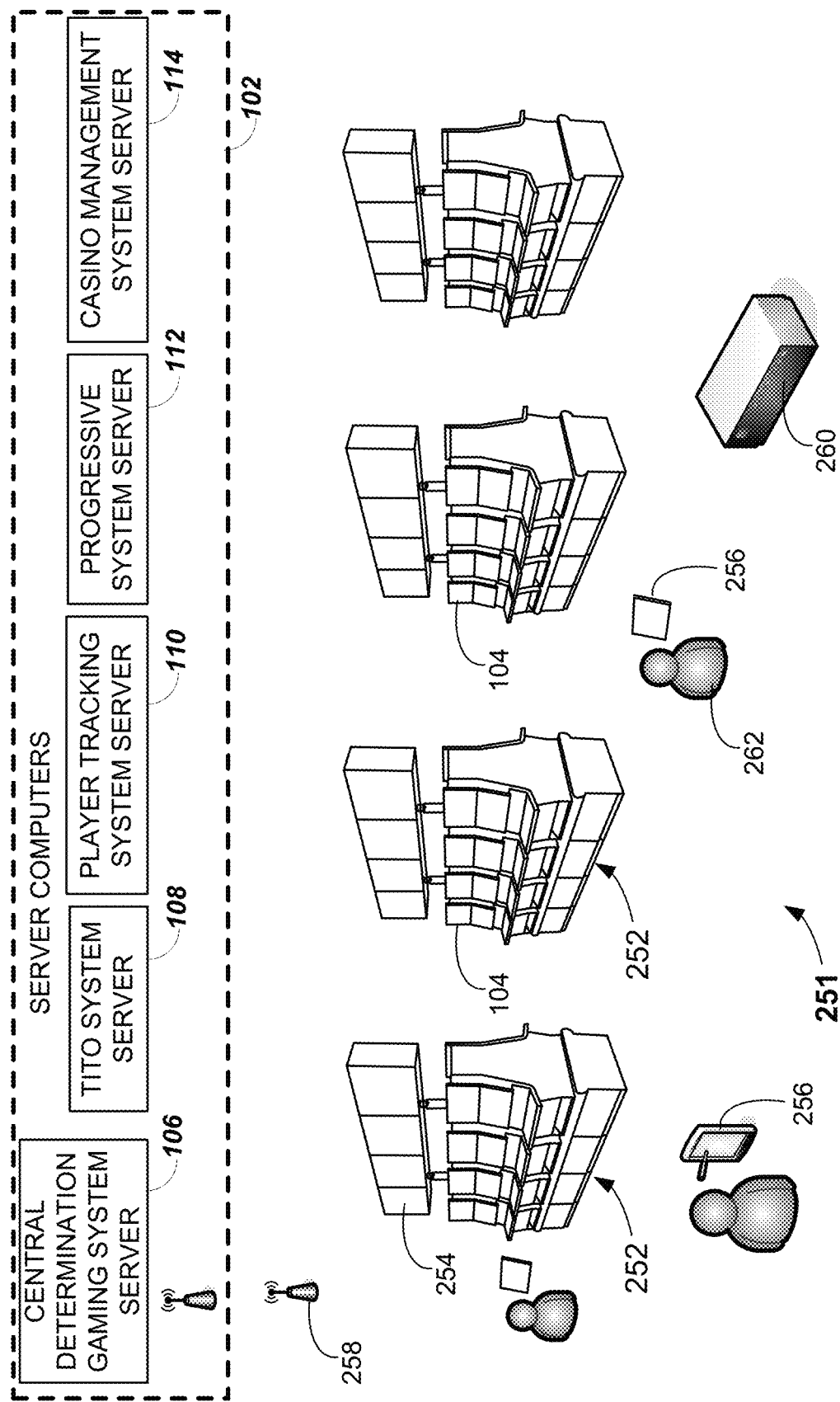
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264a, 264b and 264c are capable of communication via one or more networks 417. The networks 417 may, for example, include one or more cellular telephone networks, the Internet, etc. In this example, the EUDs 264a and 264b are mobile devices: according to this example the EUD 264a is a tablet device and the EUD 264b is a smart phone. In this implementation, the EUD 264c is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282a, servers 284a and one or more workstations 570a. The servers 284a may, for example, be configured to provide access to a library of games for online game play. In some examples, code for executing at least some of the games may initially be stored on one or more of the storage devices 282a. The code may be subsequently loaded onto a server 284a after selection by a player via an EUD and communication of that selection from the EUD via the networks 417. The server 284a onto which code for the selected game has been loaded may provide the game according to selections made by a player and indicated via the player's EUD. In other examples, code for executing at least some of the games may initially be stored on one or more of the servers 284a. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284b, storage devices 282b, and one or more workstations 286b. According to this example, the financial institution data center 270 is configured to maintain financial accounts, such as checking accounts, savings accounts, loan accounts, etc. In some implementations one or more of the authorized users 274a-274c may maintain at least one financial account with the financial institution that is serviced via the financial institution data center 270.

According to some implementations, the gaming data center 276 may be configured to provide online wagering games in which money may be won or lost. According to some such implementations, one or more of the servers 284a may be configured to monitor player credit balances, which may be expressed in game credits, in currency units, or in any other appropriate manner. In some implementations, the server(s) 284a may be configured to obtain financial credits from and/or provide financial credits to one or more financial institutions, according to a player's "cash in" selections, wagering game results and a player's "cash out" instructions. According to some such implementations, the server(s) 284a may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
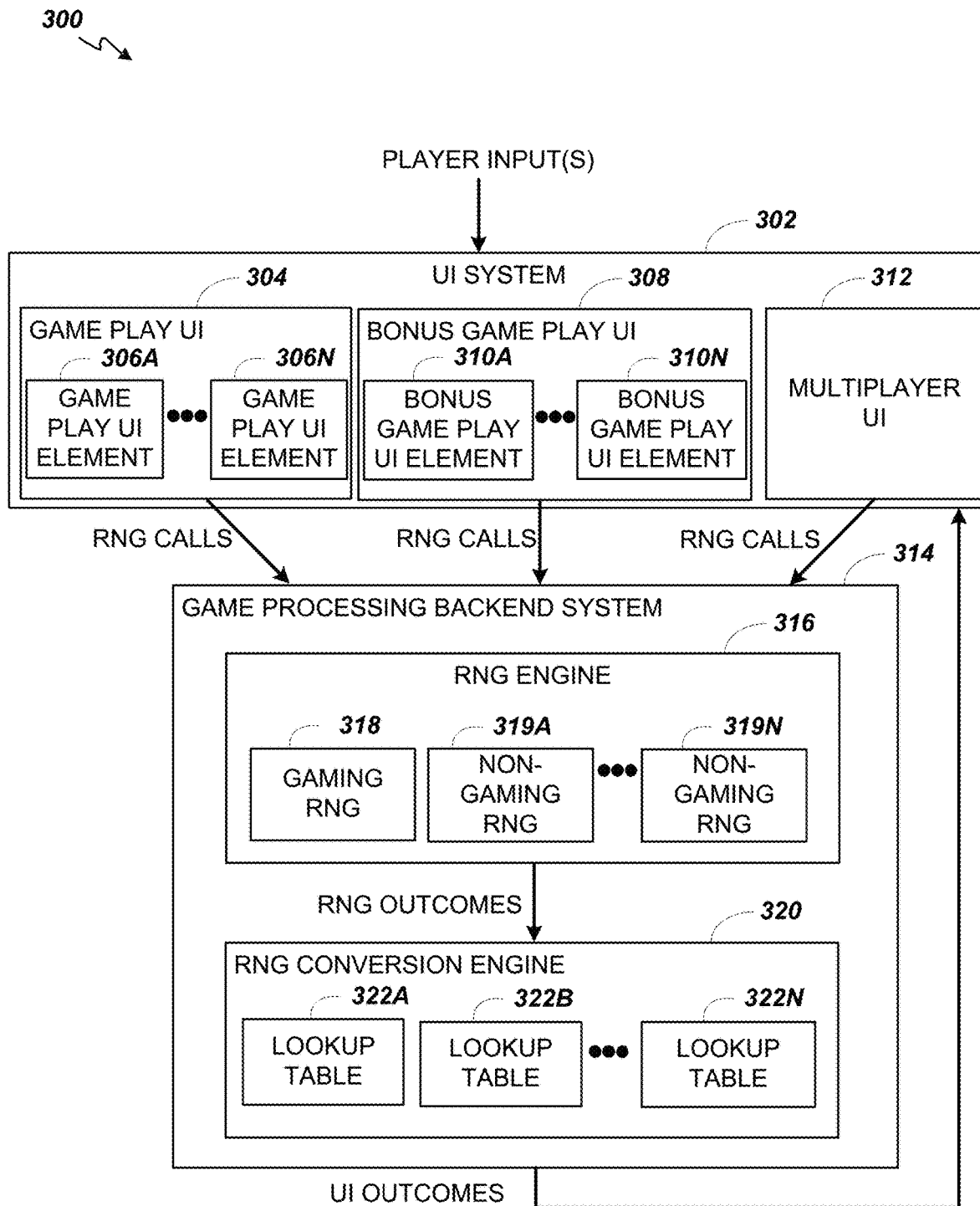
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
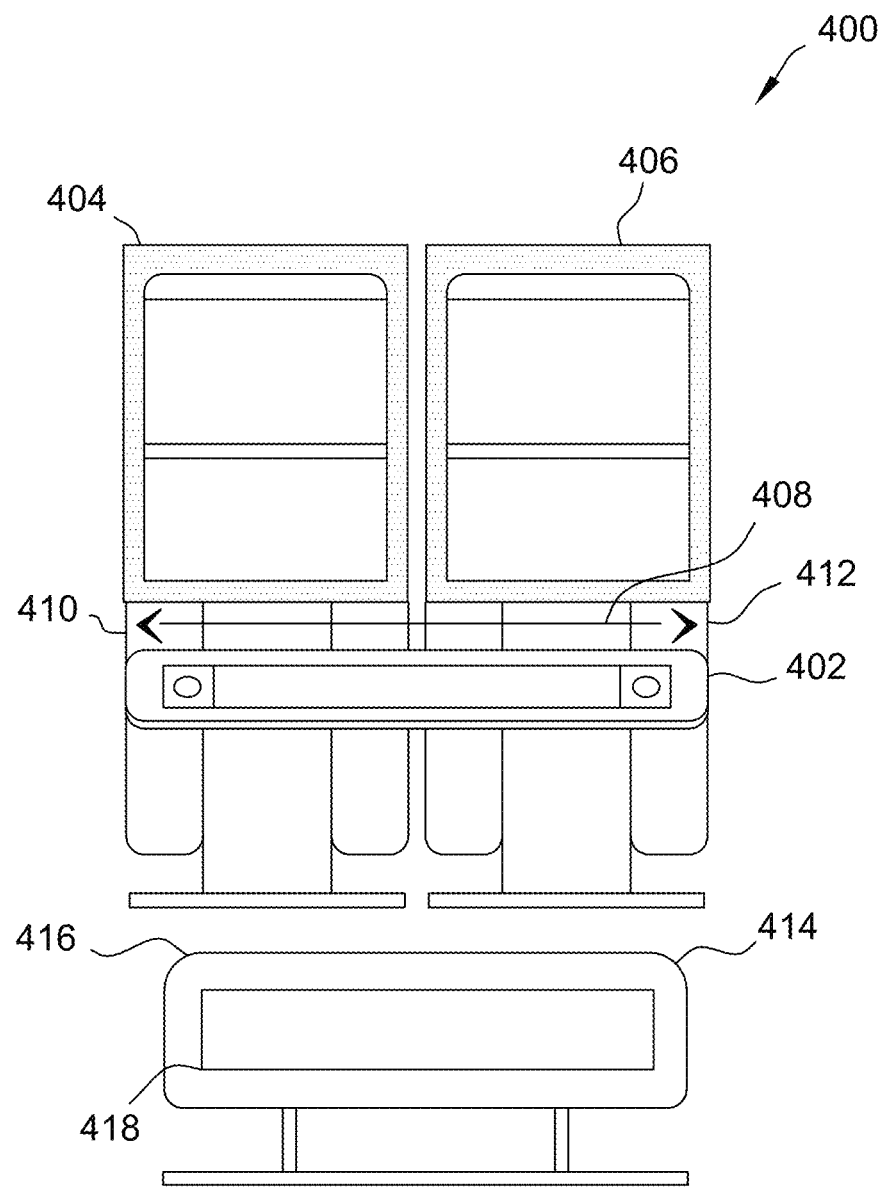
FIG. 4 is a front view of an example system for community gaming, including a button deck assembly defining a shared or community interface.
Figure 5:
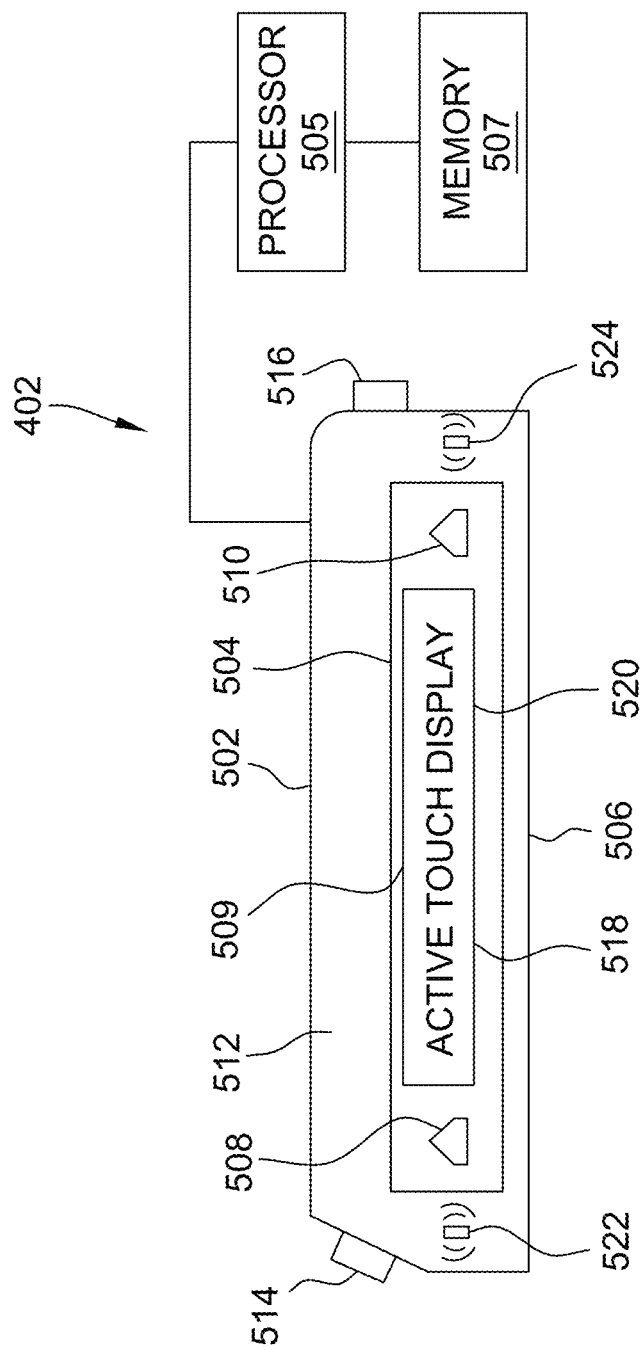
FIG. 5 is a perspective view of the shared interface and button deck assembly shown at FIG. 4.

FIG. 4 is a front view of a system 400 for community gaming. System 400 includes a shared interface 402 (or a "mega virtual button deck") coupled to a first EGM 404 and a second EGM 406. FIG. 5 is a perspective view of shared interface 402. In the example embodiment, and with combined reference to FIG. 4 and FIG. 5, shared interface 402 may include a button deck assembly 502. Button deck assembly 502 may be implemented as the button deck 120 in the EGMs 104A-104X (shown at FIG. 1) or in the other player interfaces of the machines and systems described herein, such as in player interface 232 (shown in FIG. 2). Button deck assembly 502 may also be implemented as a slide-out button deck assembly, as described with reference to U.S. Patent Application Publication No. 2019/0096161, which is hereby incorporated by reference in its entirety.

The button deck assembly 502 includes a video display 504 that may be used, for example, as part of the player interface 232 in the EGMs 104A-104X and gaming systems described above. The video display 504 may be a liquid crystal display (LCD). Alternatively, another type of display video display such as cathode ray tube screen device, a light emitting diode (LED) display, an active-matrix organic light-emitting diode (AMOLED) display, a plasma screen display, a cathode ray tube screen device, or any other suitable video display unit providing an appropriate picture and resolution for the game being played.

Button deck assembly 502 may include a support plate or flange 506, which may include one or more openings that receive mechanical pushbuttons, such as mechanical pushbuttons 508 and 510, and which may be mounted thereto with fasteners in a spaced or gapped relation to a top surface 512 of the video display 504 as shown. As such, the pushbuttons 508 and 510 may float over top surface 512 while being mechanically isolated from video display 504 via flange 506. An optional gasket may be provided to waterproof the button deck assembly 502, and a variety of control circuitry may extend around and/or under flange 506 to a controller or processor 505, which can be provided in any suitable location relative to video display 504 (e.g., on an underside of display 504, on a rear surface of display 504, and the like).

In various embodiments, as described herein, processor 505 may include a memory device 507, which may store instructions for execution by processor 505 that enable operations as described herein, such as community gaming via display 504.

Video display 504 may include a capacitive touch screen layer to provide a touchscreen interface 509. In various embodiments, the touchscreen interface 509 may be a transparent conductor such as indium tin oxide (ITO). In another embodiment, another touch sensitive element may be provided to realize a surface capacitive touchscreen or a projective capacitor touchscreen. Briefly, a surface capacitive touchscreen includes sensors at the corners of the screen and a thin evenly distributed film across the surface of the touch screen layer, whereas a projective capacitive touchscreen uses a grid of rows and columns on the touchscreen layer with a separate chip for sensing. Capacitive touch screen technology is not central to an understanding of the present disclosure and not described further herein.

In at least some embodiments, video display 504 may also include one or more openings, which may be fitted over the mechanical pushbuttons 508 and 510 to provide a low profile player interface including the pushbuttons 508 and 510. The openings may be complementary in shape with the outer profile of the pushbuttons 508 and 510. The pushbuttons 508 and 510 may thus be received in and occupy nearly an entirety of each respective opening, with only a slight gap between the outer profile of the pushbuttons 508 and 510 and the inner periphery of the openings.

Additionally or alternatively, in at least some embodiments, mechanical pushbuttons 508 and/or 510 may not be disposed within one or more openings of button deck assembly 502 and/or video display 504. For example, in at least one embodiment, mechanical pushbuttons 508 and/or 510 may be inductively coupled to an induction coil disposed on or near an undersurface of button deck assembly 502. As a result, mechanical pushbuttons 508 and/or 510 may be disposed and/or mounted on a top surface (e.g., a play surface) of button deck assembly 502 without extending into openings within button deck assembly 502.

One or more induction coils disposed on or near the undersurface of button deck assembly 502 (e.g., diametrically opposite mechanical pushbuttons 508 and/or 510 but separated by a thickness of button deck assembly 502) may be configured to detect motion of mechanical pushbuttons 508 and/or 510, such as by measuring an change in or alteration to an electrical and/or magnetic property of the corresponding induction coil when pushbuttons 508 and/or 510 are moved or depressed relative to the induction coils. In various embodiments, electrical properties that may be measured to detect activation of a pushbutton 508 and/or 510 by a player may include, for example, inductance, effective ohmic resistance, a quality and/or loss factor, a loss angle, a time constant, a resonant frequency, such as a resonant frequency fixed with a given capacitor, and the like.

In contrast with a conventional, static pushbutton having a fixed appearance, the pushbuttons 508 and 510 may be dynamic pushbuttons having practically any appearance desired depending on an electronic configuration of the shared interface 402 by the controller or processor 505 of the shared interface 402. Specifically, the pushbuttons 508 and 510 may include transparent surfaces that allow a portion of the video display 504 to be seen through the pushbutton 508 and 510.

The appearance of the pushbuttons 508 and 510 may therefore be electronically changed via changing the graphics, colors, videos or animations in the video display 504 beneath the pushbuttons 508 and 510, such as to accommodate different games. Likewise, pushbuttons 508 and 510 may be electronically changed via the video display 504 to have a different appearances at different times in the same game, and may also serve different functions in the same game or different games via electronic reconfiguration of the video display 504 in and around the area in the shared interface 402 occupied by the pushbuttons 508 and 510.

Various player interfaces for the same or different games are possible via the video display 504, the touch screen layer, and the pushbuttons 508 and 510. As a result, the button deck assembly 502 is highly reconfigurable to provide different play interfaces that are visually and functionally distinct from one another to accommodate different games while otherwise using the same hardware in the button deck assembly 502. The same button deck assembly 502 can therefore be more or less universally used on different gaming machines and in different gaming systems to play different games, or the same button deck assembly 502 can facilitate presentation and play of multiple and different games on the same gaming machine or system.

Advantageously, button deck assembly 502 can be configured to present a practically unlimited number of graphic themes and color schemes to provide substantially different game impressions and game experiences. As opposed to conventional button decks that are custom designed for a specific game, substantial cost savings in providing game machines and introducing new games is beneficially provided by the electronically reconfigurable button deck assembly 502.

The versatility and benefits of the reconfigurable button deck assembly 502 including the dynamic pushbuttons 508 and 510 are further described in U.S. Pat. No. 10,431,037, incorporated by reference herein, including example game play interfaces and display processes, control algorithms, game play options and functionality, and player interaction. In certain embodiments, however, the pushbuttons 508 and 510 need not be dynamic at all, and instead of being transparent may be painted or provided with a label, for example, to impart a fixed, static appearance.

In addition to the features described above, and with continuing reference to FIG. 4 and FIG. 5, in at least some example embodiments, the button deck assembly 502 may be adapted to be mechanically coupled to at least two EGMs 404 and 406. For example, flange 506 may include at least a first mechanical fastener 514 and a second mechanical fastener 516. In the example embodiment, first mechanical faster 514 and second mechanical fastener 516 may include latches or brackets capable of engaging a portion (e.g., a cabinet) of EGM 404 and EGM 406, respectively. Although two mechanical fasteners 514 and 516 are described, in other embodiments, any other suitable number of fasteners may be used to engage button deck assembly 502 with EGM 404 and EGM 406. Similarly, although in the example embodiment, button deck assembly 502 is shown in mechanical engagement with two EGMs 404 and 406, in some embodiments, button deck assembly 502 may be adapted to engage any suitable number of EGMs (e.g., three or more EGMs).

As a result, in the example embodiment, button deck assembly 502 may be capable of engaging a plurality of EGMS, such as both of EGM 404 and EGM 406, to create a shared interface 402 between EGM 404 and EGM 406. As shown, shared interface 402 may include pushbutton 508 located substantially adjacent first EGM 404, and second pushbutton 510 located substantially adjacent second EGM 406. The placement of pushbuttons 508 and 510, as shown, may as described in additional detail below, facilitate interaction by one or more players with EGMs 404 and 406.

In addition to the mechanical couplings between button deck assembly 502 and EGMs 404 and 406, button deck assembly 502 may also be communicatively coupled, such as by one or more wires and/or wirelessly, to EGM 404 and EGM 406. For example button deck assembly 502 may communicate with EGMs 404 and/or 406 using any suitable wireless communications protocol, such as BLUETOOTH, WiFi, near field communications (NFC), narrow band internet of things (IOT), such as any 4G and/or 5G wireless communications protocol, any other radio frequency (RF) protocol, and the like. Button deck assembly 502 may therefore also communicate with EGM 404 and EGM 406, such as to enable control of each EGM 404 and 406 by a player seated or positioned at each EGM 404 and 406. In other words, a first player seated at first EGM 404 may interact with button deck assembly 502 (e.g., either via pushbutton 508 and/or via touchscreen interface 509 provided by button deck assembly 502) to control first EGM 404. Likewise, a second player seated at second EGM 406 may interact with button deck assembly 502 (e.g., either via pushbutton 510 and/or via touchscreen interface 509 provided by button deck assembly 502) to control second EGM 406.

In some embodiments, touchscreen interface 509 provided by button deck assembly 502 may be visually divided (e.g., by processor 505) into two portions, such as a left side 518 and a right side 520. Left side 518 may provide a portion of touchscreen interface 509 (e.g., one or more spin and/or bet buttons as well as other interface functionality) for the first player positioned at first EGM 404. Similarly, right side 520 may provide a portion of touchscreen interface 509 (e.g., one or more spin and/or bet buttons as well as other interface functionality) for the second player positioned at second EGM 406. As a result, the first player (left side) may be provided pushbutton 508 and/or left side 518 of interface 509 for controlling EGM 404. Likewise, the second player (right side) may be provided pushbutton 510 and/or right side 520 of interface 509 for controlling EGM 406.

Button deck assembly 502 may thus be coupled (mechanically and communicatively) to a plurality of EGMs 404 and 406, and dimensioned, as shown, to span or include a distance 408, defined between a left side 410 and a right side 412 of EGMs 404 and 406. Accordingly, button deck assembly 502 may, in the example embodiment, define an oversized, shared or communal, interface 402 for controlling the plurality of EGMs 404 and 406. As described above, the touchscreen interface 509 of button deck assembly 502 may be partitioned into separate touchscreen interfaces, 518 and 520, for controlling respective EGMs 404 and 406. Likewise, as described above, one or more pushbuttons, such as pushbuttons 508 and 510 may be provided for controlling EGMs 404 and 406, respectively. Moreover, as described herein, pushbuttons 508 and 510 may be dynamic (e.g., dynamically illuminated by video display 50) and/or static, in various implementations.

In addition, in various implementations, one or more wireless chargers, such as a first wireless charger 522 and/or a second wireless charger 524, may be provided for charging a wireless device of one or more players positioned at EGMs 404 and 406. Although not central to an understanding of the present disclosure, wireless chargers 522 and 524 may, in some embodiments, be implemented as pushbuttons 508 and/or 510 and/or otherwise as described in U.S. Pat. No. 10,978,901, which is hereby incorporated by reference in its entirety.

In the example embodiment, the oversized, shared button deck assembly 502 may be implemented to achieve a variety of advantageous and exciting gameplay features. For example, in at least some embodiments, button deck assembly 502 may be implemented to facilitate a shared or community game provided on video display 504, where during the shared game, the first player positioned at EGM 404 and the second player positioned at EGM 406 may participate in a game, such as a bonus or feature game, that takes place on video display 504 rather than on the respective displays of EGMs 404 and 406. In some embodiments, the shared game may include, for example, any suitable two player game, such as poker, blackjack, and/or any game that can be played by two or more players.

In addition, in at least some embodiments, button deck assembly 502 may be implemented to facilitate tournament play, in which a single player, seated, for instance, toward a center position of button deck assembly 502, may be enabled to pay two EGMs 404 and 406 at once (e.g., simultaneously, in turns, etc.) In some embodiments, button deck assembly 502 may also facilitate "tag team" style games, during which one player hands off control of one or more EGMs 404 and/or 406 and/or button deck assembly 502 for portions of games, portions of game segments, and the like. In addition, incorporation of button deck assembly 502 between multiple EGMs may facilitate and enable different types of side betting opportunities, such as, in one example, a side betting opportunity that permits a first player to bet on a game outcome for a second player, and the like (e.g., a player of EGM 404 may place a side bet via button deck assembly 502 on one or more game outcomes of a player positioned at EGM 406).

In additional implementations, button deck assembly 502 may enable a "tug of war" between a player positioned at EGM 404 and a player positioned at EGM 406, where for instance, the oversized display 504 spanning EGMs 404 and 406 may display characters pulling on a rope with a flag tied in the middle, and after a time period, the player with the flag on their side is awarded a bonus award, and the like. In some implementations, button deck assembly 502 may facilitate the passing of credits and/or other items, data, and the like between players, where for example, a first player at EGM 404 may swipe an item right from left side 518 of display 504 toward right side 520 of display 504 to pass the item to a companion player positioned at EGM 406.

In other implementations, each EGM 404 and 406 may provide the same or a different game to each respective player, and a bonus when it occurs, may be displayed on one side 518 or 520 of display 504, depending, for instance, on which EGM 404 or 406 triggers the bonus. Moreover, in at least some embodiments, button deck assembly 502 may be configured to provide an attract mode graphic or video when it is not in use, where the oversized dimensions of button deck assembly 502 may facilitate an enhanced visual appearance that attracts players from greater distances and is visible from further away.

Similarly, in some cases, an oversized bench 414 may be provided that spans substantially the length or distance 408 between EGMs 404 and 406. A side 416 of bench 414 may also include a video display 418, which may be communicatively coupled to and/or controlled by processor 505 of button deck assembly 502 to display a variety of features, such as an oversized attract mode, a replica of a bonus or feature game, in real time, being played on button deck assembly 502, and the like.

In addition, in at least some implementations, players may interact with button deck assembly 502 to partition credits in different ways between EGMs 404 and 406. For example, a player positioned at EGM 404 may interact with button deck assembly 502 to specify that a first percentage or portion of credits entered should be applied to a game played on EGM 404, while a second percentage or portion of the credits entered should be applied to a game played on EGM 406.

In some embodiments, button deck assembly 502, in combination with system 400, may enable a variety of unique opportunities for the establishment of progressive style games, such as for example, the treatment of EGMs 404 and 406 (or other pluralities of EGMs coupled to a button deck assembly 502 of any size) as being grouped together and contributing toward a miniature progressive funded, and capable of being won, solely by the plurality of EGMs coupled to button deck assembly 502.

Accordingly, it can be seen that button deck assembly 502 is capable of enabling and facilitating a wide variety of unique game play opportunities, many of which could not be achieved in the absence of an oversized button deck assembly 502 joined to a plurality of EGMs 404 and 406. These advantages and features may be further enhanced by the implementation of button deck assembly 502 between a larger number of EGMs (e.g., greater than two EGMs) and/or in different shapes. For example, in at least some implementations, button deck assembly 502 may be arranged in various polygonal shapes (e.g., square, rectangular, etc.) as well as various arcuate shapes (e.g., circular, elliptical, etc.).

In some embodiments, the display and/or other gameplay functions may be primarily controlled and/or executed by processor 505 of button deck assembly 502 or another processing component of shared interface 402, and EGMs 404 and 406 may operate in response to instructions received from processor 505. Additionally, or alternatively, processor 505 may be controlled by and/or operate in response to instructions received from EGMs 404 and 406, such that any combination of processor 505, EGMs 404 and 406, and/or any external (e.g., server-side) processors in communication with EGMs 404 and 406 may cooperate to provide display and gameplay functions for system 400.

In some embodiments, one or more external processors (e.g., of a backend server such as game processing backend system 314 shown in FIG. 3) may be used to perform any of the multiplayer gameplay functions described herein for games being executed and/or displayed on two or more different EGMs (e.g., EGMs 404 and 406), user devices (e.g., EUDs 264*a*, 264*b* and 264*c* shown in FIG. 2C), or any combination thereof, without use of a physical coupling between the devices such as button deck assembly 502. In such embodiments, the backend server may be coupled (e.g., wirelessly) in communication with the EGMs or user devices (e.g., via networks 417) and may at least partially control and/or execute display and/or gameplay functions on the EGMs and user devices. For example, as described with respect to button deck assembly 502, such a backend server may enable awards provided for one user at one EGM or user device to be identified and "shared" with another user at another EGM or user device by communicating with the EGMs and or user devices, and/or may enable competitive gaming between two users by receiving game data from one or more EGMs and/or user devices and comparing the received game data corresponding to determine one or more "winners" from among these users based on the game data.

In some embodiments, processor 505 may be configured to communicate with EGMs 404 and 406 and/or facilitate communication between EGMs 404 and 406. Accordingly, button deck assembly 502 may receive gameplay data and/or other data (e.g., current spin credits, game and/or RNG call outcomes, currently displayed game features) from EGMs 404 and 406 and/or may provide instructions to EGMs 404 and 406 to facilitate multiplayer game features for users of the gaming devices.

For example, in some embodiments, button deck assembly 502 may provide a multiplayer "sharing" feature between EGMs 404 and 406. The button deck assembly may detect, at one of EGMs 404 and 406, an award of, for example, credits, free spins, prizes, multipliers, bonus game features, and/or other game features, and instruct the other of EGMs 404 and 406 to display the awarded feature and/or another feature (e.g., half of what was awarded to the other player). This may be accompanied by an animated display and/or message on oversized display 504. In another example, button deck assembly 502 may facilitate competition between two or more players, by detecting, for example, game outcomes at EGMs 404 and 406, determining a winner based on the game outcomes, and displaying a winner from among the two or more players at oversized display 504. In such embodiments, button deck assembly 502 may instruct the gaming machine associated with the winner to provide one or more additional awards (e.g., credits, free spins, prizes, multipliers, bonus game features) to the winning player. By providing game features such as these, button deck assembly 502 may engage potential players who desire a multiplayer experience.

In some embodiments, processor 505 may be configured to receive first award data from EGM 404 corresponding a first award, transmit second award data to the EGM 406 causing the EGM 406 to display a second award determined based on the first award, and cause video display 504 to display an animation indicating a transfer of an award from the first electronic gaming machine to the second electronic gaming machine.

In some embodiments, processor 505 may be configured to receive first gameplay data from EGM 404, receive second gameplay data from EGM 406, and compare the first gameplay data and the second gameplay data to determine a winner, and cause video display 504 to display an indication of the winner.

Figure 6:
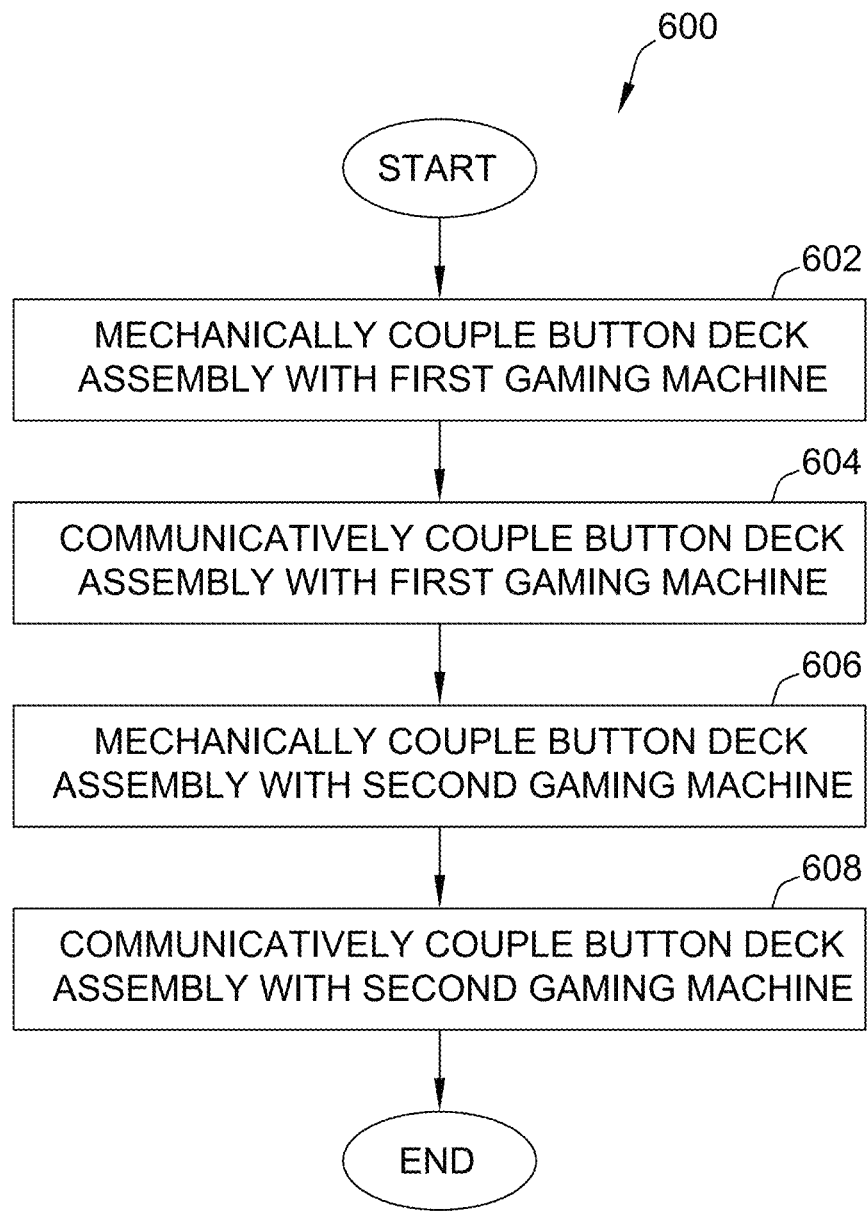
FIG. 6 is a flowchart illustrating an example for connecting the shared interface and button deck assembly shown at FIG. 4 and FIG. 5 to plurality of EGMs.

FIG. 6 is a flowchart illustrating a process 600 for connecting a shared interface 402, defined by button deck assembly 502, to plurality of EGMs 404 and 406. In the example embodiment, button deck assembly 502 may be mechanically coupled to and/or engaged with a first EGM 404 (step 602). Button deck assembly 502 may also be communicatively coupled, as described herein, to EGM 404 to facilitate communication with EGM 404 (step 604). In addition, button deck assembly 502 may be mechanically coupled to and/or engaged with a second EGM 406 (step 606). Further, button deck assembly 502 may be communicatively coupled to EGM 406 to facilitate communication with EGM 406.

An oversized button deck assembly defining a shared user interface is thus described. The button deck assembly can be coupled to a plurality of electronic gaming machines to form an oversized user interface that can be shared between each of the plurality of gaming machines. In some embodiments, the button deck assembly includes one or more mechanical pushbuttons as well as a video display device, which may be partitioned or segregated into one or more display portions, such as one display portion for every gaming machine to which the button deck assembly is coupled. As a result, a plurality of players may interact with the shared interface provided by the button deck assembly to provide control instructions to their respective gaming machines. Moreover, in at least some embodiments, during a bonus or feature game, the video display device of the button deck assembly may be controlled to display a shared or community game.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A shared interface configured to connect to a plurality of electronic gaming machines, the shared interface comprising:
    a button deck assembly including a display device;
    a memory device; and
    a processor configured to execute instructions stored on the memory device, which when executed, cause the processor to at least:
        communicate with a first electronic gaming machine to provide a first control instruction to the first electronic gaming machine;
        communicate with a second electronic gaming machine to provide a second control instruction to the second electronic gaming machine;
        provide a shared game via the display device, the shared game capable of being played by a first player of the first electronic gaming machine and a second player of the second electronic gaming machine;
        receive first gameplay data from the first electronic gaming machine;
        receive second gameplay data from the second electronic gaming machine;
        compare the first gameplay data and the second gameplay data to determine a winner; and cause the display device to display an indication of the winner.

2. The shared interface of claim 1, further comprising:
a flange surrounding at least a portion of the button deck assembly, the flange including at least:
a first mechanical fastener configured to couple the button deck to a cabinet of the first electronic gaming machine, and
a second mechanical fastener configured to couple the button deck to a cabinet of the second electronic gaming machine, whereby the button deck is at least partially supported by the first electronic gaming machine and the second electronic gaming machine.

3. The shared interface of claim 1, wherein the button deck assembly further comprises one or more mechanical pushbuttons, and wherein the processor is further configured to receive input from the one or more mechanical pushbuttons.

4. The shared interface of claim 3, wherein the processor is further configured to cause the display device to dynamically illuminate the one or more mechanical pushbuttons.

5. The shared interface of claim 1, wherein the display device comprises a touchscreen.

6. The shared interface of claim 1, wherein the processor is further configured to communicate wirelessly with the first electronic gaming machine and the second electronic gaming machine.

7. The shared interface of claim 1, wherein the processor is configured to:
receive first award data from the first electronic gaming machine corresponding a first award;
transmit second award data to the second electronic gaming machine causing the second electronic gaming machine to display a second award determined based on the first award; and
cause the display device to display an animation indicating a transfer of an award from the first electronic gaming machine to the second electronic gaming machine.

8. A computer-implemented method performed by a shared interface configured to connect to a plurality of electronic gaming machines, the shared interface including a button deck assembly including a display device, the method comprising:
communicating with a first electronic gaming machine to provide a first control instruction to the first electronic gaming machine;
communicating with a second electronic gaming machine to provide a second control instruction to the second electronic gaming machine;
initiating a shared game via the display device of the button deck assembly, the shared game capable of being played by a first player of the first electronic gaming machine and a second player of the second electronic gaming machine;
receiving first gameplay data from the first electronic gaming machine;
receiving second gameplay data from the second electronic gaming machine;
comparing the first gameplay data and the second gameplay data to determine a winner; and
causing the display device to display an indication of the winner.

9. The computer-implemented method of claim 8, wherein the shared interface include a flange surrounding at least a portion of the button deck assembly, the flange including at least a first mechanical fastener configured to couple the button deck to a cabinet of the first electronic gaming machine and a second mechanical fastener configured to couple the button deck to a cabinet of the second electronic gaming machine, whereby the button deck is at least partially supported by the first electronic gaming machine and the second electronic gaming machine.

10. The computer-implemented method of claim 8, wherein the button deck assembly further includes one or more mechanical pushbuttons, and wherein the method further comprises receiving input from the one or more mechanical pushbuttons, and causing instructions to be communicated to the first and second electronic gaming machine.

11. The computer-implemented method of claim 10, further comprising causing the display device to dynamically illuminate the one or more mechanical pushbuttons.

12. The computer-implemented method of claim 8, wherein the display device includes a touchscreen, and wherein the display device is configured to display one or more virtual buttons that prompt an input to one or more of the electronic gaming machines.

13. The computer-implemented method of claim 8, further comprising communicating wirelessly with the first electronic gaming machine and the second electronic gaming machine.

14. The computer-implemented method of claim 8, further comprising:
receiving first award data from the first electronic gaming machine corresponding a first award;
transmitting second award data to the second electronic gaming machine causing the second electronic gaming machine to display a second award determined based on the first award; and
causing the display device to display an animation indicating a transfer of an award from the first electronic gaming machine to the second electronic gaming machine.

15. A non-transitory computer-readable media having computer-executable instructions embodied thereon, wherein when performed by a processor a shared interface configured to connect to a plurality of electronic gaming machines, the shared interface including a button deck assembly including a display device, a memory device, and the processor, the computer-executable instructions cause the processor to:
communicate with a first electronic gaming machine to provide a first control instruction to the first electronic gaming machine;
communicate with a second electronic gaming machine to provide a second control instruction to the second electronic gaming machine;
provide a shared feature game via the touch-sensitive display device, the feature game capable of being played by a first player of the first electronic gaming machine and a second player of the second electronic gaming machine;
receive first award data from the first electronic gaming machine corresponding a first award;
transmit second award data to the second electronic gaming machine causing the second electronic gaming machine to display a second award determined based on the first award; and
cause the display device to display an animation indicating a transfer of an award from the first electronic gaming machine to the second electronic gaming machine.

16. The non-transitory computer-readable media of claim 15, wherein the button deck assembly further includes one or more mechanical pushbuttons, and wherein the instructions further cause the processor to receive input from the one or more mechanical pushbuttons.

17. The non-transitory computer-readable media of claim 15, wherein the computer-executable instructions further cause the processor to:
- receive first gameplay data from the first electronic gaming machine;
- receive second gameplay data from the second electronic gaming machine; and
- compare the first gameplay data and the second gameplay data to determine a winner; and
- cause the display device to display an indication of the winner.

\* \* \* \* \*